Jan. 17, 1961
S. DONIGER
2,968,489
CUTTING TOOLS
Filed March 3, 1959
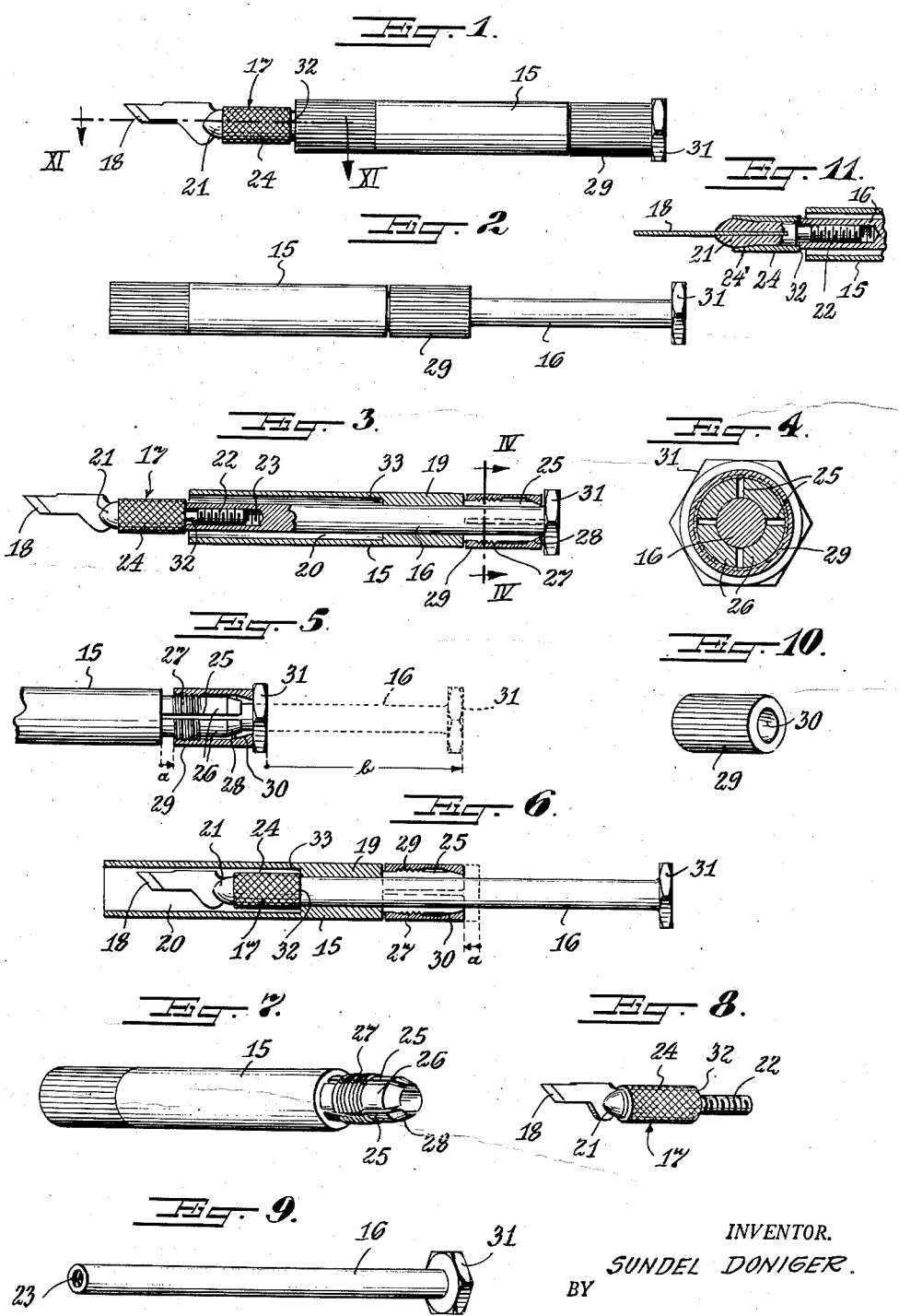
INVENTOR.
SUNDEL DONIGER.
BY
Howard P. King United States Patent Office 2,968,489
Patented Jan. 17, 1961

2,968,489
CUTTING TOOLS

Sundel Doniger, New York, N.Y. (X-Acto Inc., 48—41 Van Dam St., Long Island City 1, N.Y.)

Filed Mar. 3, 1959, Ser. No. 796,971

4 Claims. (Cl. 279—48)

This invention relates to Cutting Tools, and more particularly to a cutting tool for hand manipulation and having a replaceable blade.

In its general aspect, the invention contemplates an improved cutting tool wherein the blade is retractable into the handle and with the blade adapted to be securely retained in either its projected or retracted position.

Likewise broadly considered, the invention proposes an improved cutting tool with retractable blade wherein the blade is rigidly retained in its selected cutting position so as to neither slide nor twist.

Pertinent to the foregoing objects, the invention provides a cutting tool wherein the handle functions as a guard into which the blade may be retracted for absolute safety in carrying, handling and storage of the tool.

More specifically, the invention provides for projection of the tool from its guard or handle to any desired extent, partially or wholly, and provides for tight locking of the blade at any such position of projection.

The invention also provides a construction enabling depth-gauging cuts made by the blade.

Another object of the invention is to provide a cutting tool with a handle of generally cylindrical character having a slidable plunger for operating the blade, and said plunger having a non-cylindrical head of greater diameter than the cylindrical handle so as to keep the tool from rolling.

Other objects, advantages and novel structural features of the invention will appear to persons skilled in the art to which it appertains, as the description proceeds, both by direct recitation thereof and by implication from the context.

Referring to the accompanying drawing, in which like numerals of reference indicate similar parts throughout the several views;

Figure 1 is a side view of the cutting tool of the present invention, showing the blade extended;

Figure 2 is also a side view, but with the blade retracted;

Figure 3 is a longitudinal sectional view of the blade extended;

Figure 4 is a cross-section on line IV—IV of Fig. 3;

Figure 5 is a side elevation of the posterior end portion of the cutting tool with the lock sleeve shown in longitudinal section;

Figure 6 is a longitudinal sectional view similar to Fig. 3 and showing, in this instance, the blade retracted;

Figure 7 is a perspective view showing the body portion of the handle alone;

Figure 8 is a perspective view of the blade chuck with a blade mounted therein;

Figure 9 is a perspective view of the plunger alone;

Figure 10 is a perspective view of the lock sleeve; and

Figure 11 is a longitudinal sectional view of the blade chuck and proximate portions of the handle and plunger, the chuck stem and adjacent portions of the jaws being shown in elevation.

In the specific embodiment of the invention illustrated in said drawing, the cutting tool comprises in general a hollow cylindrical handle or body 15 within which is a plunger 16 the forward end of which carries a blade chuck 17 for gripping a blade 18. Said body 15, near its posterior end, is internally thickened so as to provide a bearing portion 19 within which the plunger has sliding fit which maintains the said body and plunger coaxial one with the other at any position of sliding of the plunger. Forwardly from said bearing portion 19, the interior bore 20 of said body is slightly larger in diameter than the diameter of the plunger sufficient to accommodate entry therein of the blade chuck 17 and blade 18 when the plunger 16 is pulled rearwardly.

Essentially, the chuck 17 provides two or more longitudinal, and somewhat resilient, jaws 21 with sufficient longitudinal space therebetween to receive the shank of the tool blade 18, the jaws conveniently being made integral with a chuck stem 22 here shown as having screw-thread mounting in a threaded socket 23 coaxially in the forward end of the plunger. The stem 22 is of smaller diameter than the group of jaws so as to receive a collet collar 24 to pass thereover during assembly of the chuck, enabling said collar to be moved forwardly to a location around the jaws 21. The contiguous faces of the collar and jaws flare toward their outer or forward ends at 24' so that pressing the collar forwardly with sliding engagement against the jaws, will flex the jaws toward each other to grip the blade 18, and reversely, when the collar is slid rearwardly, the jaws will release said blade. Sufficient friction is developed between the collar and the jaws by merely sliding the collar forwardly by hand to enable the jaws and stem, which are integral, to be rotated by rotating the collar, and thereby the stem is screwed home in its socket 23, bringing the rear end 32 of the collar against the forward end of the plunger, whereupon further rotation of the collar enforces tight wedging of the jaws therein by virtue of the tapered faces, and obtains a corresponding tight grip of the jaws on the shank of blade 18.

The posterior end portion of the body 15 is of smaller exterior diameter than the more forward portion of said body, and is conveniently provided with longitudinal saw-slits 25 shown as at right angles to each other and thereby providing, in the present showing, four longitudinally extending fingers 26 the basal ends whereof are integral with the non-slitted portion of said body. As illustrated, it is preferable that the slits 25 extend forwardly from the posterior end of the body only for the part thereof that is of reduced diameter. Near the basal ends of said fingers, on their external surfaces, are provided screw threads 27 circumferentially of the fingers as a group. The posterior end portions of said fingers have their external surfaces tapered inwardly rearwardly so that as a group they provide an approximately frusto-conical surface 28.

Mounted on the posterior end portion described above as of reduced diameter, is a locking sleeve 29 near the forward end of which are screw threads in cooperative engagement with aforesaid screw threads 27 so the sleeve may be advanced or retracted longitudinally by rotation thereof. The internal bore of said sleeve proximate to the posterior end thereof, tapers inwardly rearwardly in conformity to the taper of the group of fingers, as at 30, so as to ride thereon and press the fingers toward each other as the sleeve is screwed home. This pressing of the fingers toward each other squeezes them into tight engagement with the plunger and locks the plunger very securely at any location to which the plunger had been moved before screwing the sleeve home. Full disengagement of the tapered surface of the sleeve from the tapers of the fingers will be obtained with only a short longitudinal movement of the sleeve in the unscrewing motion imparted to the sleeve in use, for instance, as designated by distance *a* in Figs. 5 and 6. The internal bore within the group of fingers is a continuation of the interior cylindrical surface of bearing portion 19 of the body so that, in absence of pressure on the fingers the plunger is freely slidable and rotatable.

The posterior end of the plunger is provided with a head 31 thereon which will limit forward sliding of the plunger by engagement of said head with the posterior end of the sleeve. The head 31 will prevent loss of the sleeve should the sleeve become completely unscrewed. It may also be here noted that the external diameter of the sleeve is approximately the same as the external diameter of the body, constituting a completely cylindrical barrel, and that the head 31 of the plunger is larger than the barrel and is non-cylindrical so as to provide one or more flat sides that will rest on a table or other supporting surface when the tool is laid down and will keep the tool from rolling. It will also be found in practice that if the head is pressed forwardly while tightening the sleeve it also will move longitudinally most of the distance *a* that the sleeve moves forward while being screwed home if such condition is desired.

As a desirable constructional feature, I make the collet collar 24 with a greater diameter than the diameter of the plunger but still small enough to enter the forward bore 20 of the body 15. Consequently the posterior end of said collar constitutes a shoulder 32 directed rearwardly at the forward end of the plunger. Likewise bearing portion 19 provides a forwardly directed shoulder 33 at the rear of said forward bore 20, this latter shoulder acting as a stop for limiting rearward movement of the plunger and retraction of the blade into the body. The plunger thus has a longitudinal permissible sliding movement from its fully retracted position when said shoulders engage each other, to its fully forward position when the head 31 engages sleeve 29, which may be termed its amplitude of movement and designated *b* in Figure 5. At the fully retracted terminus of amplitude, the blade chuck is deeply within the body, approximately midway of the length of the body, and so the usual blade employed therewith is likewise retracted into the body and completely guarded thereby. At the forward terminus of amplitude, the blade chuck collet collar 24 is fully exposed and may be operated to exchange blades while in that position. While in the present showing only a single blade has been illustrated, various types are made available in practice for such purposes as depth-gauge cutting, carving, etching, hollowing, piercing, sawing, scoring, scribing, slicing, slitting, trimming and for other uses. The plunger may be securely locked at any position to which it is slid within its amplitude range of movement, and thus at a selected location the blade may project just far enough so the proximate end of the body will function as a depth gauge for the cut to be made.

Finally, it may be said that the forward chuck assembly is assembled and applied in place at the factory so as to obtain a very tight screw-fit of the chuck stem 22 in its socket 23 making it, from the user's standpoint, a permanent attachment. It consequently will not be unscrewed from the plunger under normal use and yet the collet collar may be screwed tightly by the user and unscrewed without likelihood of loosening the chuck stem from its mounting in the end socket of the plunger. For convenience of manipulation, suitable knurling or other roughening of all or part of the outer surface of the body and of the collet collar 24 and locking sleeve 29 may be provided for the convenient gripping thereof by the user. The user should tighten the locking sleeve when the plunger is fully retracted so as to lock the same and thereby retain the blade in completely guarded position when not in use, thereby affording absolute safety in carrying, handling or storing the tool.

I claim:

1. A tool holder comprising an elongated hollow body having forward and posterior ends, a plunger of greater length than said body longitudinally slidable in the hollow of said body and always projecting in part from said posterior end of said body, a tool chuck at the forward end of said plunger, said chuck having a shank threaded into the end of said plunger and having tool-engaging jaws and a collet collar located in its entirety beyond the forward end of said plunger and adapted to be engaged and slid forwardly by said end of the plunger, thereby advancing the collet further onto the jaws as the threaded shank of the chuck is screwed further into said plunger for thereby squeezing said jaws together for gripping a tool, said hollow of said body having a greater diameter than both said plunger and collet collar from the forward end of said body inwardly to a greater depth than the length of said collet collar admitting said collet collar to be retracted entirely within said hollow body, and said plunger having a length sufficient to project said collet collar entirely out of the forward end of said body with the posterior end of said plunger still in part projecting from the posterior end of said body.

2. A tool holder in accordance with claim 1, wherein gripping means are provided at the posterior end of said plunger for releasably retaining said plunger at any selected position of retraction and projection of said collet collar in its relation to said body.

3. A tool holder in accordance with claim 1, wherein said plunger has a head at its posterior end too large to enter the hollow of said body and limiting forward movement of the plunger in said body, the longitudinal dimension of said plunger from its forward end to the most proximate face of said head being substantially equal to the length of said body thereby limiting forward movement of the plunger to a position such that the forward end of the plunger and forward end of the body are substantially in a common plane with the collet collar projecting in its entirety forwardly beyond said plane.

4. A tool holder in accordance with claim 3, wherein the hollow of said body has a forwardly directed shoulder more proximate to the posterior end of said body than to its forward end and protruding into the path of retraction of said collet collar and limiting retraction of said collet collar and plunger.

References Cited in the file of this patent

UNITED STATES PATENTS

| | | |
|---|---|---|
| 207,620 | Parmelee | Sept. 3, 1878 |
| 237,093 | Crowell | Feb. 1, 1881 |
| 253,185 | Christlmiller | Feb. 7, 1882 |
| 1,116,532 | Armstrong | Nov. 10, 1914 |
| 1,213,133 | Poister | Jan. 16, 1917 |
| 1,685,703 | Clark | Sept. 25, 1928 |
| 1,691,047 | Chayes et al. | Nov. 13, 1928 |